United States Patent
Shao

(10) Patent No.: US 12,230,461 B2
(45) Date of Patent: Feb. 18, 2025

(54) VEHICLE HAVING MAGNETIC COUPLER AND WAKEUP SWITCH AND METHODS OF USE THEREOF

(71) Applicant: KSR IP Holdings, LLC, Wilmington, DE (US)

(72) Inventor: Lingmin Shao, London (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 18/233,605

(22) Filed: Aug. 14, 2023

(65) Prior Publication Data

US 2023/0386772 A1 Nov. 30, 2023

Related U.S. Application Data

(63) Continuation of application No. 17/896,253, filed on Aug. 26, 2022, now Pat. No. 11,769,644.

(60) Provisional application No. 63/237,861, filed on Aug. 27, 2021.

(51) Int. Cl.
| | |
|---|---|
| H01H 36/00 | (2006.01) |
| B60R 16/023 | (2006.01) |
| G05G 1/38 | (2008.04) |
| G05G 1/44 | (2008.04) |

(52) U.S. Cl.
CPC ......... *H01H 36/00* (2013.01); *B60R 16/0231* (2013.01); *G05G 1/38* (2013.01); *G05G 1/44* (2013.01)

(58) Field of Classification Search
None
See application file for complete search history.

(56) References Cited

U.S. PATENT DOCUMENTS

| | | | |
|---|---|---|---|
| 6,924,609 B2 | 8/2005 | Bürger et al. | |
| 9,446,745 B2 | 9/2016 | Elliott et al. | |
| 9,958,293 B2 | 5/2018 | Elliott et al. | |
| 10,195,938 B2 | 2/2019 | Heipel et al. | |
| 11,383,682 B2 | 7/2022 | Kim et al. | |
| 2012/0056739 A1* | 3/2012 | Lee ........................ | B60Q 1/441 |
| | | | 340/479 |

(Continued)

FOREIGN PATENT DOCUMENTS

| | | |
|---|---|---|
| JP | 2010250963 A | 11/2010 |
| WO | 2009090459 A1 | 7/2009 |
| WO | 2017015447 A1 | 1/2017 |

OTHER PUBLICATIONS

International Search Report dated Dec. 14, 2022; International Application No. PCT/US2022/041631.

*Primary Examiner* — Vicky A Johnson
(74) *Attorney, Agent, or Firm* — Dinsmore & Shohl LLP

(57) ABSTRACT

A vehicle is provided. The vehicle includes an electronic control unit and a pedal assembly. The electronic control unit switches from a powered off state to a powered on state during predetermined intervals. The pedal assembly includes pedal arm, a target, and a switch. The pedal arm moves between a plurality of positions. The target moves with the movement of the pedal arm. The target generates a magnetic field strength. The switch activates when the magnetic field strength of the target exceeds a predetermined threshold. When the switch activates, a signal is sent to the electronic control unit to activate the electronic control unit from the powered off state to the powered on state.

20 Claims, 7 Drawing Sheets

(56) References Cited

U.S. PATENT DOCUMENTS

2017/0021725 A1  1/2017  Heipel et al.
2018/0339731 A1  11/2018  Henning
2022/0379852 A1  12/2022  O'Neill

* cited by examiner

VEHICLE HAVING MAGNETIC COUPLER AND WAKEUP SWITCH AND METHODS OF USE THEREOF

CROSS-REFERENCE TO RELATED APPLICATIONS

This utility patent application is a continuation application of co-pending U.S. patent application Ser. No. 17/896,253, filed Aug. 26, 2022, which in turn claims priority benefit from U.S. Provisional Patent Application Ser. No. 63/237,861 filed Aug. 27, 2021, and entitled "Passive Pedal Force Emulator Assemblies", the entire contents of both which are incorporated herein in their entirety.

TECHNICAL FIELD

The present specification generally relates to systems and methods for activating an electronic control unit.

BACKGROUND

Vehicles are generally equipped with at least one electronic control unit (ECU). The ECU may include processors, databases, and memory devices to perform predetermined logic routines. These ECUs draw power from a battery or in other ways. In order to save on power consumption, when the vehicle is not running, ECUs may be programmed to go from a power on state into a power off state. Accordingly, when the ECU is in the powered off state, the ECU needs to be instructed to transition into a powered on state.

SUMMARY

In one embodiment, a vehicle is provided. The vehicle includes an electronic control unit and a pedal assembly. The electronic control unit switches from a powered off state to a powered on state at predetermined intervals. The pedal assembly includes a pedal arm, a target, and a switch. The pedal arm moves between a plurality of positions. The target moves with the movement of the pedal arm. The target generates a magnetic field strength. The switch activates when the magnetic field strength of the target exceeds a predetermined threshold. When the switch activates, a signal is sent to the electronic control unit to activate the electronic control unit from the powered off state to the powered on state.

In another embodiment, a vehicle is provided. The vehicle includes an electronic control unit and a pedal assembly. The electronic control unit switches from a powered off state to a powered on state at predetermined intervals. The pedal assembly includes a pedal arm, a target, and a switch. The pedal arm moves between a plurality of positions. The target moves with the movement of the pedal arm. The target generates a magnetic field strength. The switch activates when the magnetic field strength of the target exceeds a predetermined threshold. When the switch activates, a signal is sent to the electronic control unit to activate the electronic control unit from the powered off state to the powered on state.

In yet another embodiment, a method of activating an electronic control unit from a powered off state into a powered on state is provided. The method includes depressing a pedal pad of a pedal assembly to move a target between a plurality of positions, the target generating a magnetic field strength, activating a switch when the magnetic field strength of the target exceeds a predetermined threshold, and transmitting a signal from the switch to the electronic control unit. When the signal is sent to the electronic control unit, the electronic control unit is activated to the powered on state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
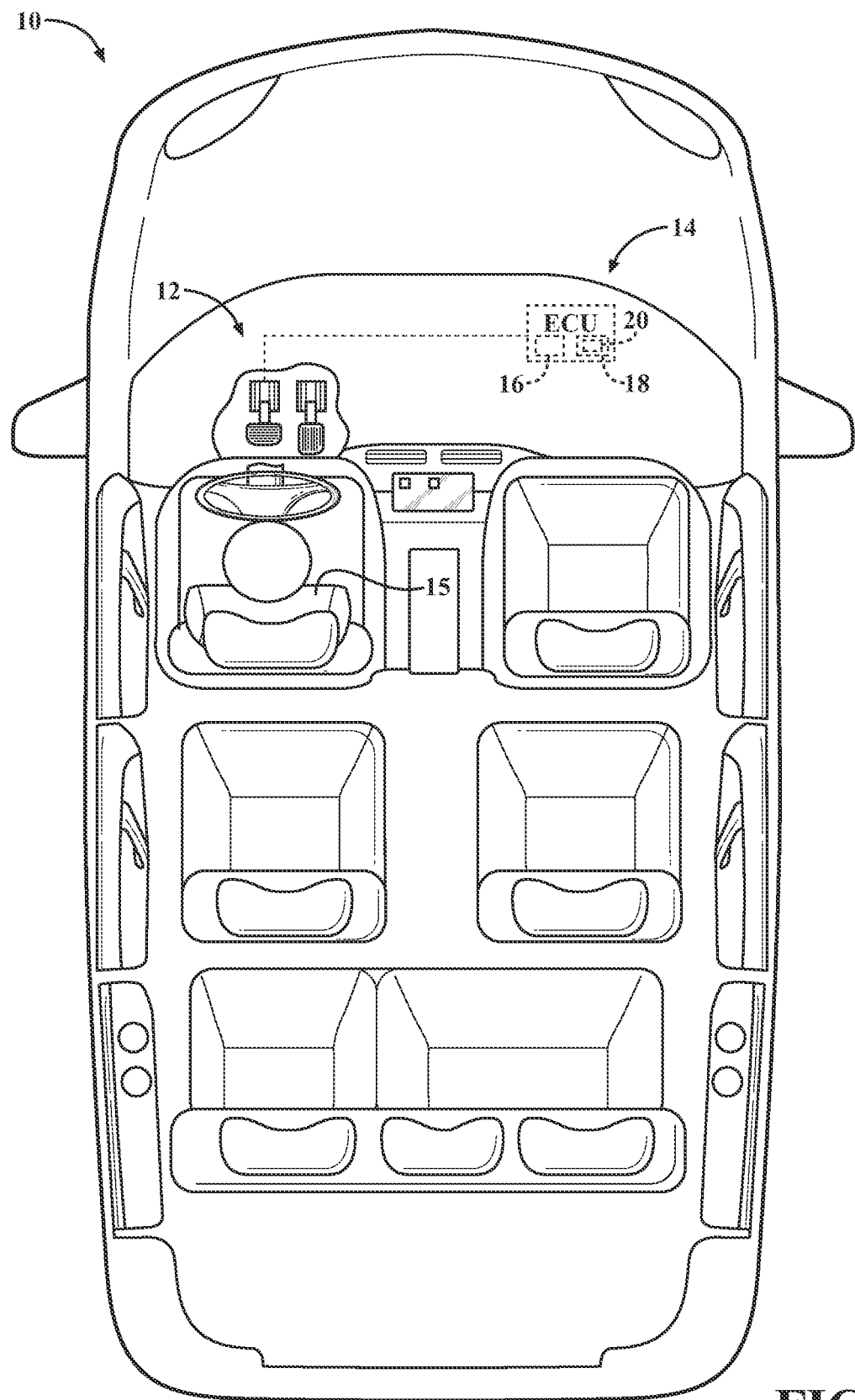
FIG. 1 schematically depicts a top down view of an example vehicle illustrating an example pedal assembly and an example electronic control unit of the vehicle according to one or more embodiments shown and described herein.

Embodiments described herein are generally directed to vehicle that has an electronic control unit that is configured to change states between a powered off state and a powered on state depending on the operating condition of the vehicle. The vehicle further includes a pedal assembly. The pedal assembly includes a pedal arm that moves between a plurality of positions, a coupler, or target, that moves with the movement of the pedal arm, and a printed wiring assembly. The target is magnetic and generates a magnetic field strength. The printed wiring assembly includes a chip and a sensor assembly. The chip acts as a switch that self-activates when the magnetic field strength generated by the target exceeds a predetermined threshold. The magnetic field strength generated by the target switch increases and decreases based on a movement of the pedal pad caused form a user depressing and releasing the force applied to the power pad. As such, when a user depress a pedal pad, the pedal arm is moved, which moves or rotates the target, which in turn changes the generated magnetic field strength.

When the target is rotated a predetermined amount, the generated a magnetic field strength exceeds a predetermined threshold, which in turn is sensed by the switch. In response, the switch self-activates and sends an activation signal to the vehicle side electronic control unit. The activation signal activates the electronic control unit, which transitions from the current powered off state into the powered on state. Concurrently, and while the electronic control unit is on the powered on state, the target is sensed by a sensor of the sensor assembly to determine the amount of movement, such as rotation, of the target, which is indicative to the amount of force applied to the pedal pad. The electronic control unit uses these sensed values to control operation of the vehicle, such as, for example, an amount of braking force to apply to the wheels.

As such, improvements over conventional systems is that the target is used to determine when the pedal is depressed the predetermined amount to generate the magnetic field strength that is sensed by the switch to self-activate and also activate the electronic control unit. Further, the target is also sensed by an angular sensor to determine the movement, such as an angular position of the target, which is indicative of the pressure applied to the pedal pad such that the electronic control unit may control various vehicle components in response. As such, by sharing the same target, interference is eliminated compared to the switch and the angular sensor using their own individual magnet target. Further improvements over conventional systems will be apparent and described in greater detail herein.

As used herein, the term "communicatively coupled" means that coupled components are capable of exchanging data signals and/or electric signals with one another such as, for example, electrical signals via conductive medium, electromagnetic signals via air, optical signals via optical waveguides electrical energy via conductive medium or a nonconductive medium, and the like.

Referring now to the drawings, FIG. 1 schematically depicts an example vehicle 10. The example vehicle 10 may generally be any vehicle with a pedal assembly 12 and one or more onboard computing devices, particularly computing devices that contain hardware for processing data, storing data, operating vehicle components, and/or the like. The one or more onboard computing devices may be an electronic control unit 14.

The electronic control unit 14 is a non-transitory computer-readable medium that stores computer-readable programming instructions for completing various processes, embodied as hardware, software, and/or firmware, according to embodiments shown and described herein. While in some embodiments the electronic control unit 14 may be configured as a general purpose computer with the requisite hardware, software, and/or firmware, in other embodiments, the electronic control unit 14 may also be configured as a special purpose computer designed specifically for performing various functionality of the vehicle 10. For example, the electronic control unit 14 may be a device that is particularly adapted to obtain sensed data from the pedal assembly 12 and instruct other components of the vehicle 10 to react in response. For example, based on the sensed data from the pedal assembly 12, the electronic control unit 14 may increase a braking effort of the vehicle 10. It should be appreciated that for illustrative purposes only, a brake pedal of the pedal assembly is depicted as communicatively coupled to the electronic control unit 14. This is non-limiting and an accelerator pedal, a clutch pedal, and/or combinations of the brake pedal, the accelerator pedal, and the clutch pedal may be communicatively coupled, whether individually, or in series, to the electronic control unit 14.

The electronic control unit 14 may be configured to transition, change states, or switch between a powered off state and a powered on state for power consumption reasons. The electronic control unit 14 may transition, change states, or switch at predetermined intervals. For example, the powered off state may generally be when the vehicle 10 is not in use and the powered on state is when the vehicle 10 is in use and thus the electronic control unit 14 is needed to perform vehicle operations and controls.

As such, the electronic control unit 14 may include a processor 16, such as a computer processing unit (CPU), that may be the central processing unit of the electronic control unit 14, performing calculations and logic operations to execute a program. The processor 16, alone or in conjunction with the other components, is an illustrative processing device, computing device, processor, or combination thereof. The processor 16 may include any processing component configured to receive and execute instructions (such as from a memory component 18).

In some embodiments, the electronic control unit 14 may include memory component 18 configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 18 may be a non-transitory, processor-readable memory. The memory component 18 may include one or more programming instructions thereon that, when executed by the processor 16, cause the processor 16 to complete various processes, such as performing a powering on state of the electronic control unit 14.

The programming instructions stored on the memory component 18 may be embodied as the one or more software logic modules 20, where each logic module 20 provides programming instructions for completing one or more tasks with respect to the operation of the vehicle 10. The logic module 20 includes a plurality of different pieces of logic, each of which may be embodied as a computer program, firmware, and/or software/hardware, which may be executable by the processor 16.

Figure 2:
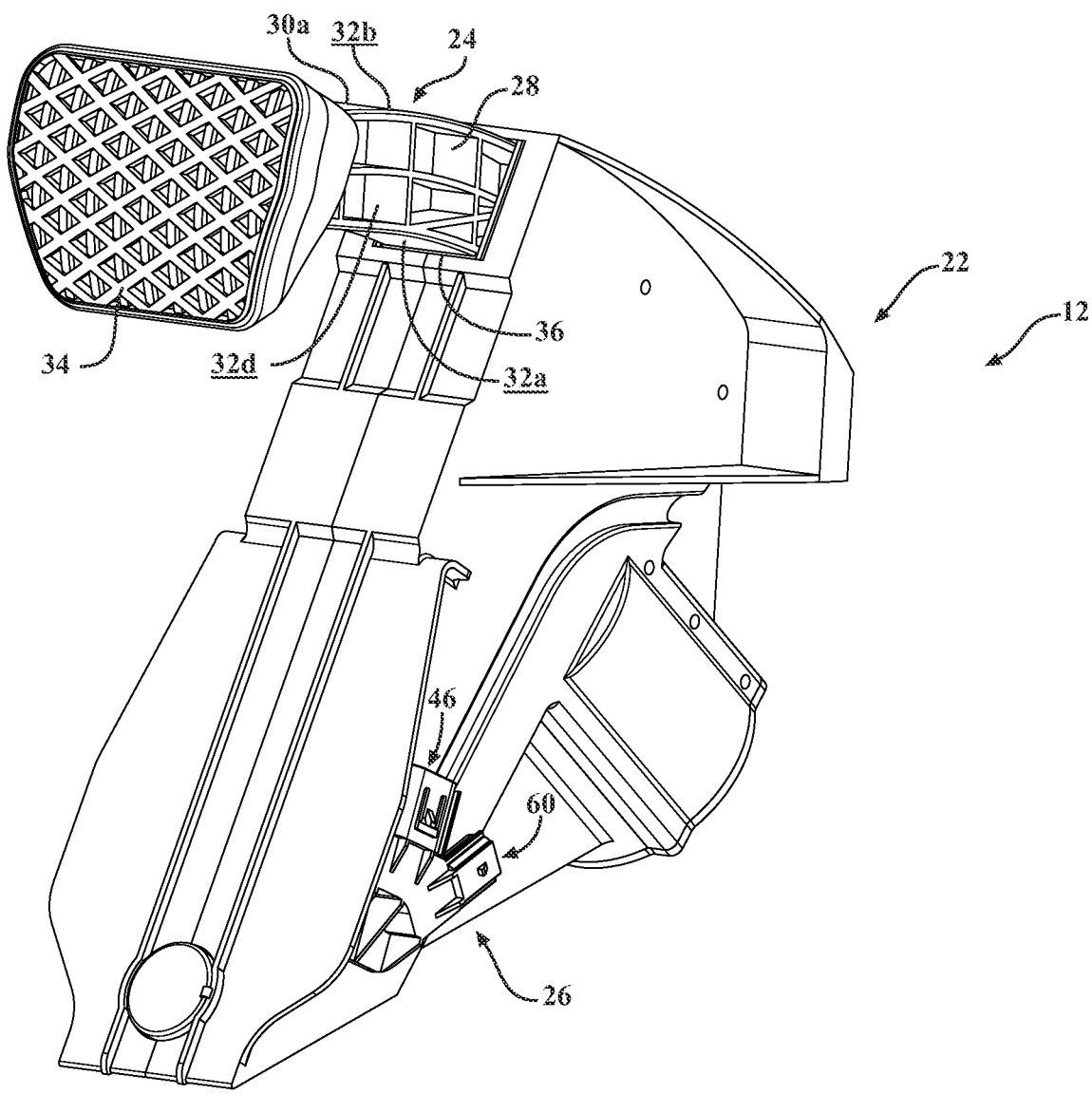
FIG. 2 schematically depicts a perspective view of the example pedal assembly of FIG. 1 according to one or more embodiments shown and described herein.
Figure 3:
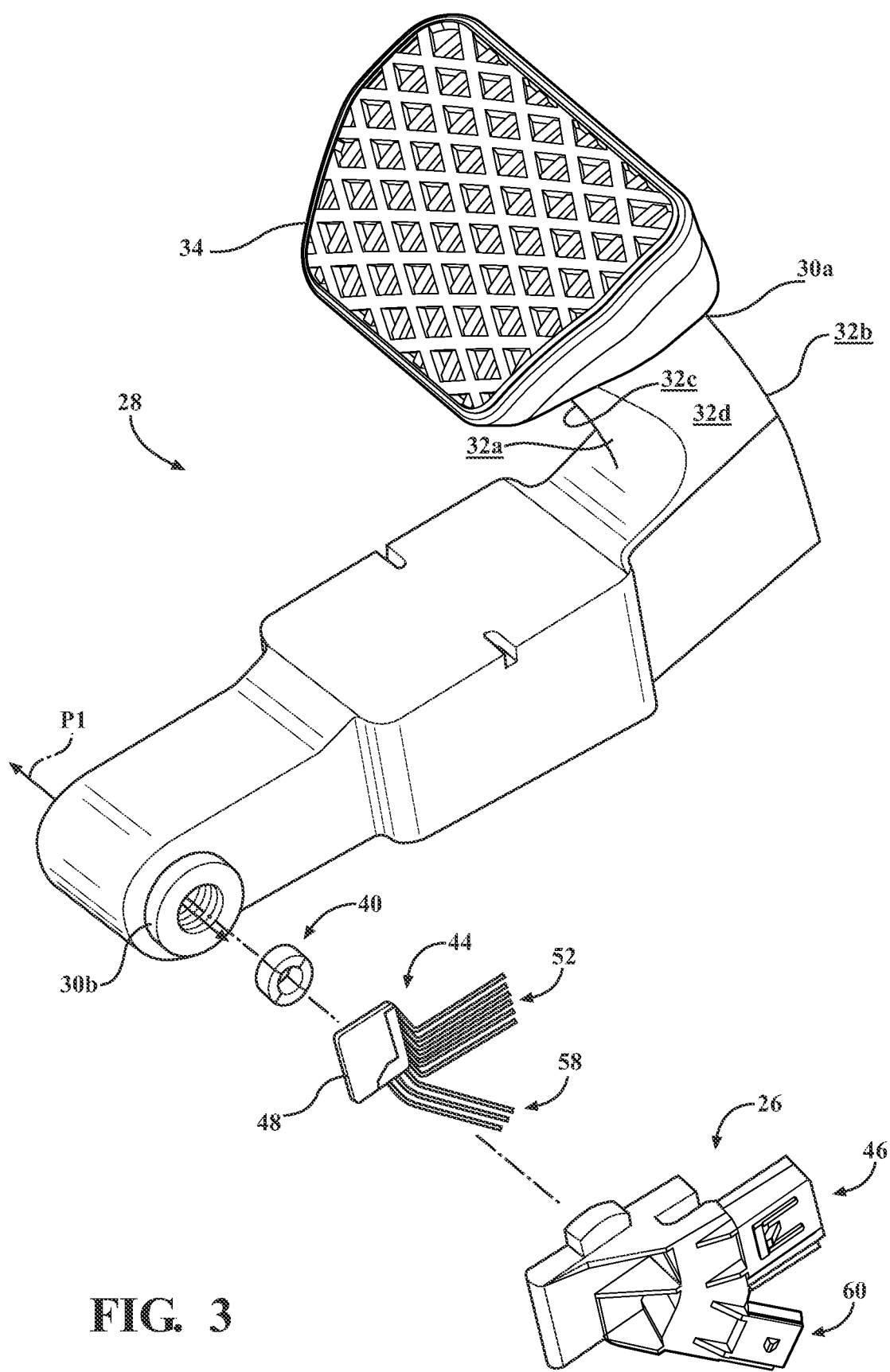
FIG. 3 schematically depicts a partial isolated view of the pedal assembly of FIG. 2 according to one or more embodiments shown and described herein.

Referring now to FIGS. 2-3, the pedal assembly 12 includes a housing 22, a pedal arm assembly 24, and an interface 26. The pedal arm assembly 24 includes a pedal arm 28, which includes a pedal pad end 30a and a pivot end 30b. Further, the pedal arm 28 includes a first surface 32a and an opposite second surface 32b and a pair of side surfaces 32c, 32d that define a thickness of the pedal arm 28. In some embodiments, the pedal arm 28 is generally shaped L shaped. In other embodiments, the pedal arm 28 may be differently shaped such as a J or a T. The pivot end 30b is pivotally coupled to the housing 22 about a pivot axis P1, as best illustrated in FIG. 3. The pedal pad end 30a receives a pedal pad 34 that a foot of a user 15 would depress against to brake, accelerate, and/or activate a clutch control. The housing 22 includes an opening 36 that receives portions of the pedal arm 28.

The housing 22 and/or the pedal arm 28 may be a molded plastic. For example, the housing 22 and/or the pedal arm 28 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/ or the like. Additionally, additives may be added such as UV absorbers, flame retardants, colorants, glass fibers, plasticizers and/or the like.

In some embodiments, the housing 22 and/or the pedal arm 28 may be formed from injection molding. In other embodiments, the housing 22 and/or the pedal arm 28 may be formed from additive manufacturing techniques. Additive manufacturing techniques refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

The housing 22 may be floor mounted. That is, in some embodiments, the housing 22 may be coupled or mounted to be positioned within or extending from a floor surface of a vehicle 10 (FIG. 1). As such, the housing 22 accommodates the pedal arm 28 at full depression to allow the pedal pad 34 to fully travel.

Figure 4:
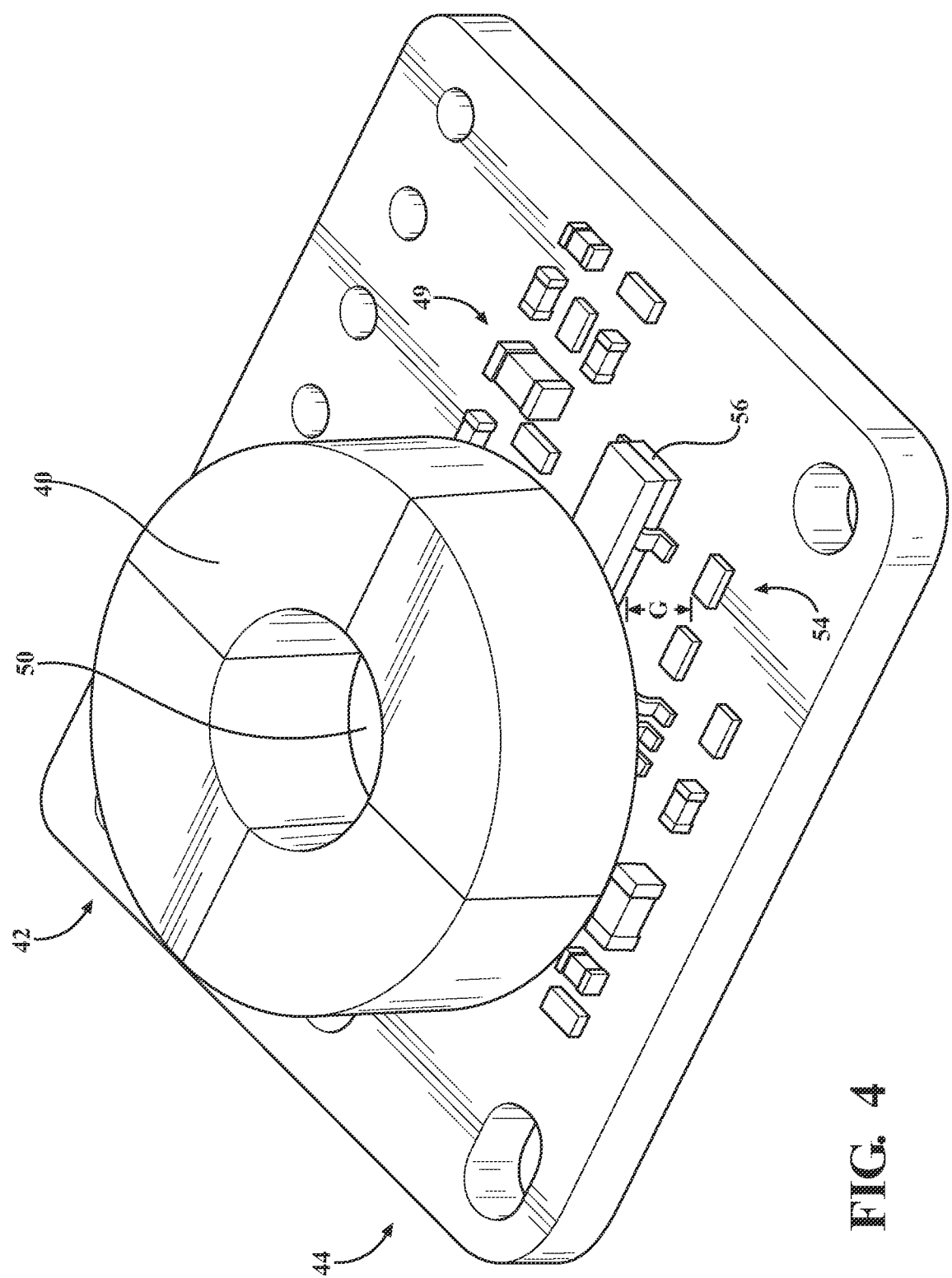
FIG. 4 schematically depicts a perspective view of a target and the printed wiring assembly of FIG. 3 according to one or more embodiments shown and described herein.
Figure 5:
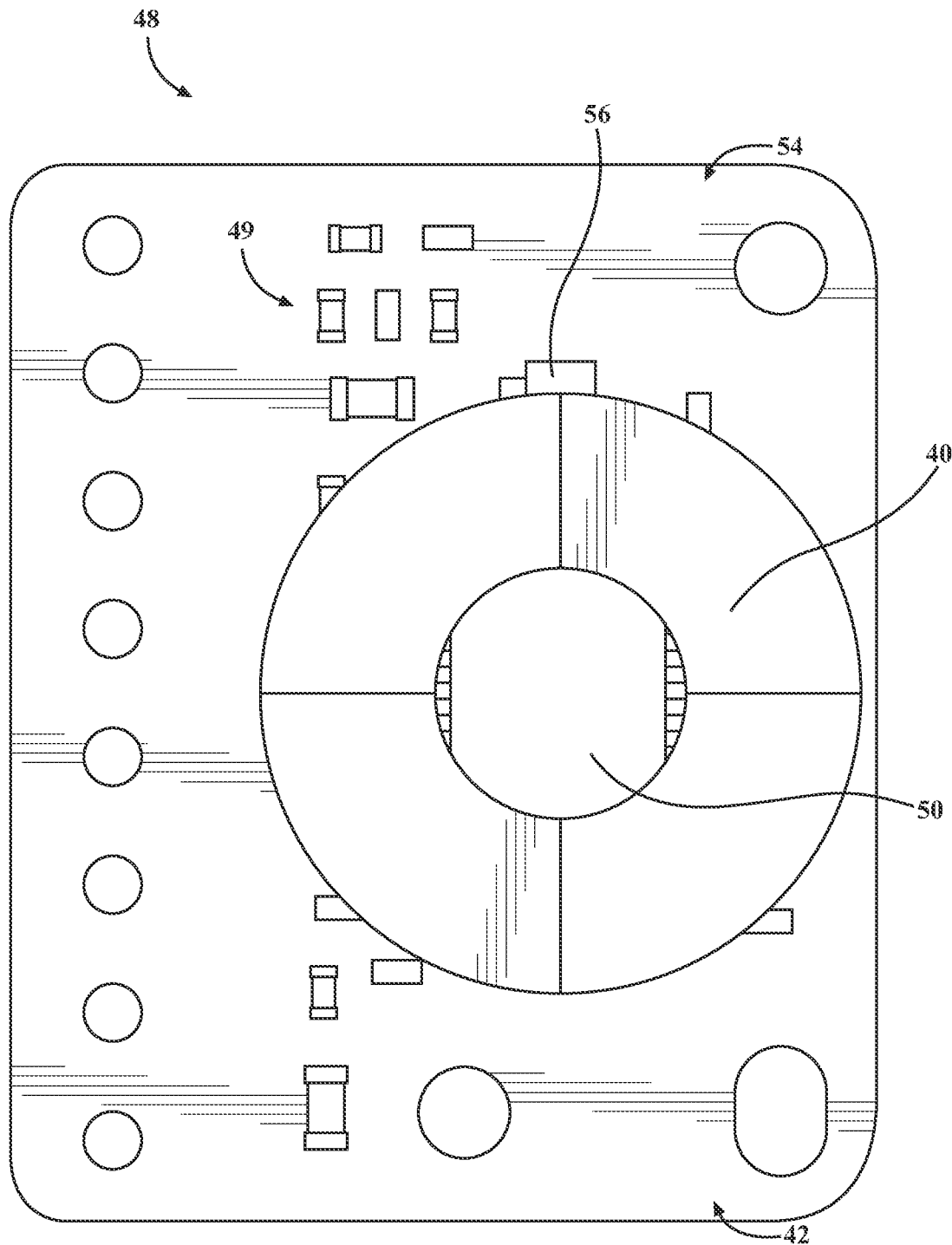
FIG. 5 schematically depicts a top down view of the target and the printed wiring assembly of FIG. 4 according to one or more embodiments shown and described herein.
Figure 6:
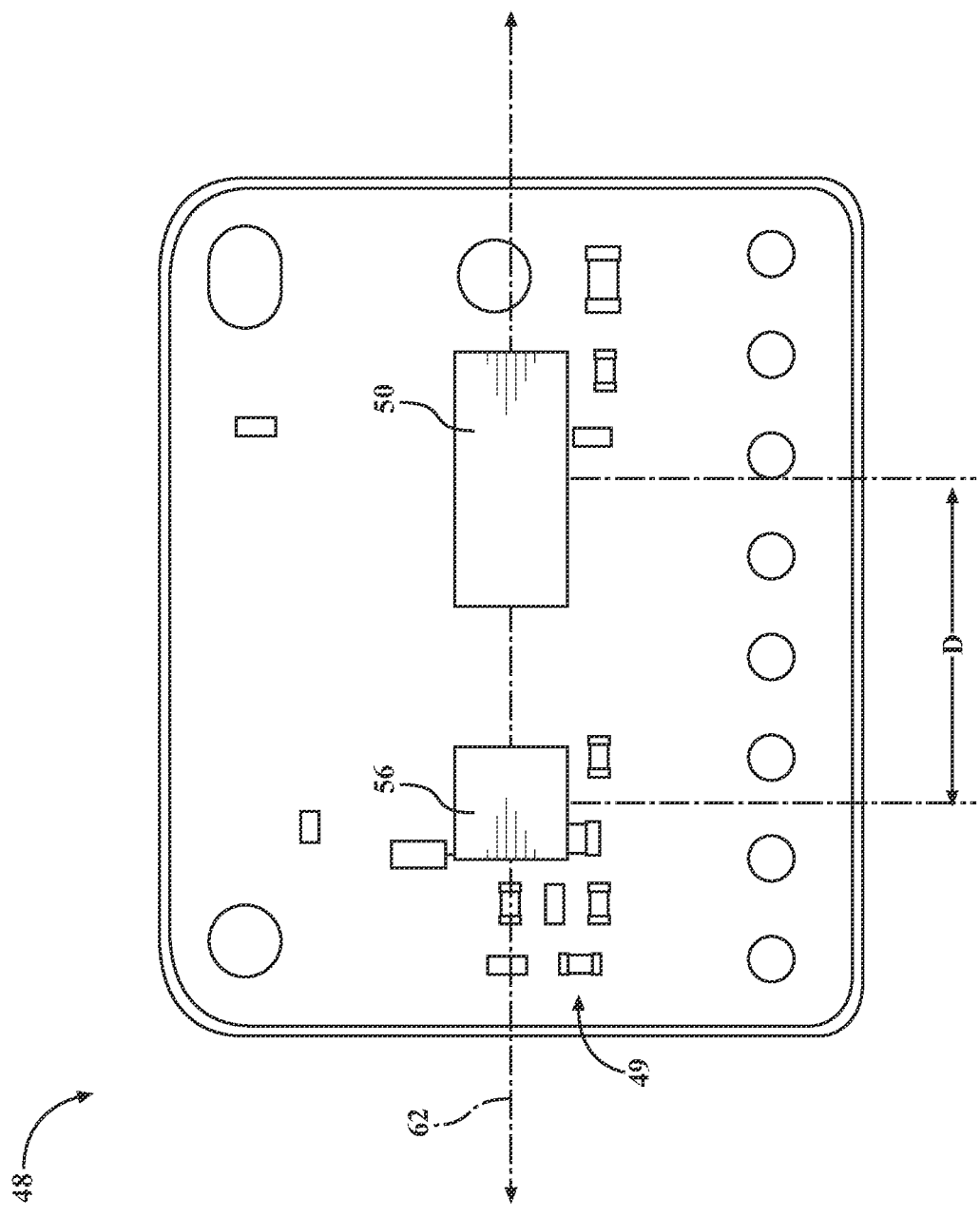
FIG. 6 schematically depicts an isolated view of the printed wiring assembly of FIG. 4 according to one or more embodiments shown and described herein.

Now referring to FIGS. 4-6 and also still referring to FIGS. 2-3, the interface 26 houses a first sensing assembly 42 for detecting a movement of a target 40, or coupler, and a second sensing assembly 54 that detects a magnetic field strength. As such, both the first sensing assembly 42 and the second sensing assembly 54 use Hall effect technology.

The target 40 is positioned at the pivot end 30b of the pedal arm 28. The target 40 may be mounted or attached to the pivot end 30b of the pedal arm 28 in the vicinity of and perpendicular to the pivot axis P. In some embodiments, the target 40 is over-molded around pivot axis P to move, such as rotate or pivot with movement of the pedal arm 28. In some embodiments, the target 40 may be a four-pole diametrical annular magnet. In other embodiments, the target 40 may be a two pole diametrical magnet and/or may be a magnet with a plurality of other shapes, such as rectangular, square, hexagonal, octagonal, and/or the like. The target 40 may move, in some embodiments, such as rotate or pivot upon movement of the pedal pad 32 of the pedal arm 28. In other embodiments, the target 40 may move in a linear direction.

In some embodiments, the first sensing assembly 42 and the second sensing assembly use or share a printed wiring assembly 44. The printed wiring assembly 44 may include a circuit board 48 (or a printed circuit board) and a plurality of discrete electrical components 49 mounted therein to perform a plurality of electrical functions. The first sensing assembly 42 may include at least one Hall effect chip 50 and a plurality of terminal pins 52 extending therefrom. In some embodiments, the at least one Hall effect chip 50 may be an angular position sensor. In other embodiments, the at least one Hall effect chip 50 may be other sensor types, such as a linear position sensor. A portion of the plurality of terminal pins 52 may be received by a connector housing 46 of the interface 26. The connector housing 46 is adapted to receive a complimentary connector on the vehicle side to communicatively couple the at least one Hall Effect chip 50 to the electronic control unit 14, as discussed in greater detail herein.

The at least one Hall effect chip 50 is sensitive to a Hall effect detection of magnetic change in-plane magnetic field components. As such the at least one Hall effect chip 50 may be an angular position sensor that senses angular movement of the target 40 by sensing changes in the in-plane magnetic field components. Further, the at least one Hall Effect chip 50 may convert a displacement, linear measurements, and/or angular measurements of the position of the target 40 to an electronic or electromagnetic signal. This information and/or data is transmitted through the plurality of terminal pins 52 and to the electronic control unit 14 for processing.

The second sensing assembly 54 senses a magnetic field strength generated by the target 40. The second sensing assembly 54 includes a chip that acts as a switch 56 that is configured to detect the magnetic field strength generated by the target 40. The switch 56 is spaced apart from the at least one Hall Effect chip 50 and has a plurality of terminal pins 58 extending therefrom that are independent from the terminal pins 52 used for the at least one Hall Effect chip 50. The switch 56 is positioned on the circuit board 48 of the printed wiring assembly 44 and includes a second connector housing 60, which receives at least a portion of the plurality of terminal pins 58. The second connector housing 60 is adapted to receive a complimentary connector on the vehicle side to communicatively couple the switch 56 to the electronic control unit 14, as discussed in greater detail herein.

Now referring to FIGS. 3 and 6, the switch 56 and the at least one Hall Effect chip 50 are spaced apart by a distance D and are aligned along the same axis, indicated by reference character 62. When the pedal pad 34 is depressed, the pedal arm 28 rotates the target 40, which changes the magnetic field strength generated by the magnetic material of the target 40. As such, the more force applied to the pedal pad 34, the more rotation of the target 40, which in turn increases the generated magnetic field strength.

Now referring back to FIGS. 3-6, in some embodiments, the switch 56 is sensitive to a Hall effect detection of magnetic change of vertical magnetic field components. In other embodiments, the switch 56 may be configured to detect a rotation of the target 40 and/or may be configured to look for a specific initial angle (e.g., keyed).

When the magnetic field strength generated by the target 40 exceeds a predetermined threshold, the switch 56 is configured to self-activate and either generate a signal or convert a displacement or vertical measurement of the target 40 as an electronic or electromagnetic signal. This information and/or data is transmitted through the plurality of terminal pins 58 to the electronic control unit 14 as an activation signal, which causes the electronic control unit 14 to transition, or change states, from the initial powered off state into the operational, or the powered on state. That is, the switch 56, for example, determines that there is a change in the magnet field generated by the target 40 that exceeds a predetermined threshold value and/or senses the angle of the target 40 that exceeds a predetermined angle threshold value, which in turn self-activates and then transmits the activation signal to the electronic control unit 14 to wake up the electronic control unit 14. As such, the switch 56 functions as a wakeup switch for the electronic control unit 14.

The target 40 may be positioned adjacent to the at least one Hall Effect chip 50 and the switch 56. The target 40 may be positionable to be spaced part or have an air gap between the target 40 and the at least one Hall Effect chip 50 and the switch 56, as best illustrated in FIG. 4 indicated by the arrow G. In some embodiments, the space or air gap between the target 40 and the at least one Hall Effect chip 50 and the switch 56 is between 1.5 to 3 millimeters. This is non-limiting and the air gap may vary. That is, the air gap between the target 40 and the at least one Hall Effect chip 50 and the switch 56 may be greater than 3 millimeters and/or less than 1.5 millimeters.

Portions of the first sensing assembly 42 and the second sensing assembly 54 may be over-molded to encapsulate the electronic components, and it may include solderless connections between the printed wiring assembly 44 and the plurality of terminal pins 52 and/or the plurality of terminal pins 58, such as compliant through-hole pins. For example, the first sensing assembly 42 and the second sensing assembly 54 may be over-molded into the interface 26, which in turn is mounted or coupled to the housing 22.

It should be understood that the first sensing assembly 42 and the second sensing assembly 54 simultaneously determine movement of the target 40 using different sensing techniques described above. That is, the switch 56 determines a magnetic field strength by sensing the vertical magnetic field components while the at least one Hall Effect chip 50 senses a movement, such as an angular movement of the target 40, by sensing the in-plane magnetic field components.

Figure 7:
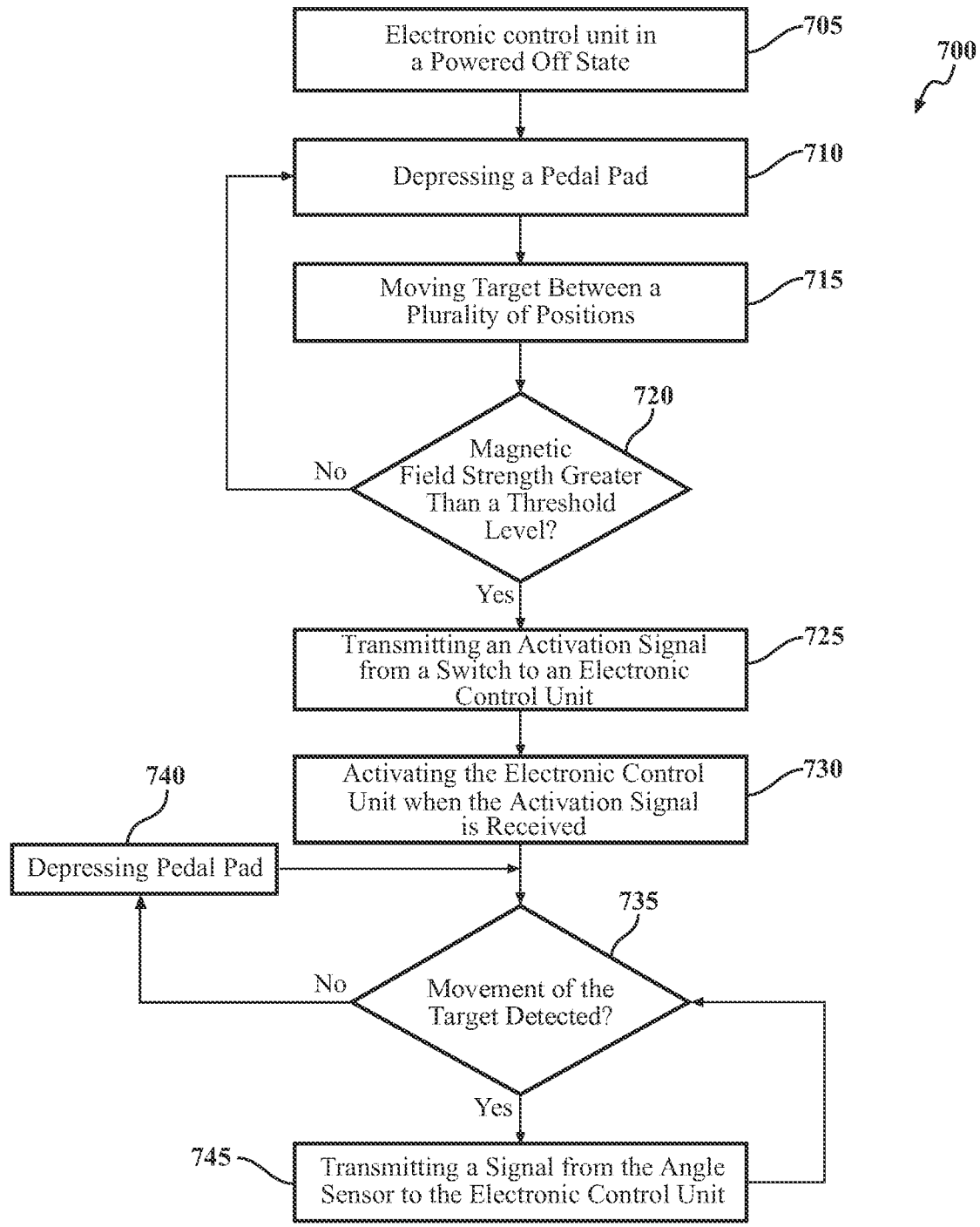
FIG. 7 depicts a flow diagram of an illustrative method of activating the electronic control unit from a power off state into a power on state according to one or more embodiments shown and described herein.

Now referring back to FIGS. 1-6 and also now to FIG. 7, a flow diagram of an illustrative method 700 of activating the electronic control unit from a power off state into a power on state is depicted.

At block 705, the electronic control unit 14 is in the powered off state. At block 710, the user 15 depresses on the pedal pad 34, which in turn moves or pivots the pedal arm 28. In response, the target 40 is moved between a plurality of positions, at block 715. The plurality of positions the target 40 is moved corresponds to the amount of force or pressure applied to the pedal pad 34 by the user 15. The target 40 may be a four-pole diametrical annular magnet. Because the target 40 is made from a magnetic material with poles, the target 40 generates or influences a magnetic field that is dependent on which pole is influencing the magnetic field. As such, changes or influence in the magnetic field may correspond to a specific pole and may be used to influence the magnetic field strength.

At block 720, the switch 56 determines whether the magnetic field strength is greater than a threshold level. If it is determined that the magnetic field strength is less than the threshold level, then the method 700 returns to block 710, where the user 15 may need to further depress onto the pedal pad 34. On the other hand, if the magnetic field strength is equal to or greater than the threshold level, at block 725, the switch 56 self-activates and transmits an activation signal from the switch 56 to the electronic control unit 14. In response to receiving the activation signal, at block 730, the electronic control unit 14 is activated. That is, the electronic control unit 14 transitions, or changes states, from the powered off state to the powered on state. As such, the depression of the pedal pad 34 a predetermined amount provides necessary change in magnetic field strength, which in turn the switch 56 provides the activation signal to activate the electronic control unit 14 such that the electronic control unit 14 may perform the operations necessary to operate the vehicle 10.

Once the electronic control unit 14 is in the powered on state, the first sensing assembly 42 then determines whether a movement of the target 40 is detected, at block 735. The movement may be linear, angular, and/or the like. If a movement of the target is not detected, then the first sensing assembly 42 awaits for the pedal pad 34 to be depressed, at block 740, and continuously loops with block 735. On the other hand, when the first sensing assembly 42 determines that there is movement of the target 40, at block 735, the first sensing assembly 42 transmits a signal from the at least one Hall Effect chip 50 (angular sensor) to the electronic control unit 14 indicative of the angle of rotation of the target 40, at block 745.

With the electronic control unit 14 in the powered on state, blocks 735-745 continuously loop to determine when the user 15 is applying a force to the pedal pad 34 such that the electronic control unit 14 may provide instructions or commend the appropriate components of the vehicle 10. For example, to activate braking components of the vehicle 10 based on the amount of movement of the target 40 sensed by the first sensing assembly 42.

With the electronic control unit 14 in the powered off state, blocks 710-730 continuously loop to determine when the user 15 is applying a force to the pedal pad 34 such that the electronic control unit 14 may receive an activation signal from the switch 56 to change the electronic control unit 14 from the powered off state to the powered on state. For example, when the user wishes to use the vehicle 10, the electronic control unit 14 needs to be activated. By depressing the pedal pad a predetermined amount, the electronic control unit 14 is awakened or woke up from the power off state into the powered on state.

As such, it should be appreciated that the same printed wiring assembly 44, interface 26 and target 40 are used to both monitor a magnetic field strength when the electronic control unit 14 is in the powered off state and determine an angular rotation of the target 40 when the electronic control unit 414 is in the powered on state.

It should now be understood that the methods and systems described herein may function to allow a user to activate or power on an electronic control unit on the vehicle side by depressing a pedal pad of a pedal assembly of the vehicle a predetermined distance or with a predetermined amount of force. A target moves or rotates in response to the force on the pedal pad and a chip that acts as a switch activates when a magnetic field strength generated by the target exceeds a predetermined threshold. A sensor assembly includes an angular sensor that senses the angular movement of the target. When the target is moved, such as by rotation, a predetermined amount such that the generated magnetic field strength exceeds the predetermined threshold, the switch self-activates and sends an activation signal to the vehicle side electronic control unit, which in turn activates the electronic control unit from the current powered off state into the powered on state. As such, by sharing the same target, interference is eliminated compared to the switch and the angular sensor using their own individual magnet target.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is claimed:

1. An assembly comprising:
    an electronic control unit configured to change between a powered off state and a powered on state at predetermined intervals;

a member configured to move between a plurality of positions, a target configured to move with the movement of the member, the target changes a magnetic field strength; and a device configured to generate a signal when the magnetic field strength change caused by movement of the target exceeds a predetermined threshold, wherein the signal is transmitted from the device to the electronic control unit to change the electronic control unit from the powered off state to the powered on state.

2. The assembly of claim 1, wherein the device is a Hall effect sensor.

3. The assembly of claim 1, further comprising:
a sensor assembly having an angular sensor configured to sense movement of the member.

4. The assembly of claim 3, wherein the electronic control unit is communicatively coupled to the angular sensor to determine the movement of the target.

5. The assembly of claim 4, wherein the angular sensor is configured to sense a target generated in-plane magnetic field components to sense the movement of the member.

6. The assembly of claim 5, wherein the electronic control unit is configured to determine the movement of the target by the target generated in-plane magnetic field components sensed by the angular sensor.

7. The assembly of claim 1, wherein the target is formed with a magnetic material.

8. The assembly of claim 1, wherein the device is configured to detect a vertical magnetic field component.

9. A system comprising:
a processor configured to change between a powered off state and a powered on state at predetermined intervals; and an assembly comprising:
a target configured to move changing a field strength; and a device configured to generate a signal when the field strength caused by movement of the target changes a predetermined amount, wherein the signal is transmitted from the device to the processor to change the processor from the powered off state to the powered on state.

10. The system of claim 9, wherein the assembly further comprises:
a sensor assembly having an angular sensor configured to sense a movement of the target; and the processor communicatively coupled to the angular sensor and configured to determine movement of the target based on the sensed movement by the angular sensor.

11. The system of claim 10, wherein the processor is configured to determine the movement of the target by determining a target generated in-plane field components.

12. The system of claim 9, wherein the device is configured to detect a vertical field component.

13. The system of claim 9, wherein the target is formed with a magnetic material.

14. An assembly comprising:
an electronic control unit configured to change between a powered off state and a powered on state at predetermined intervals; and a member configured to move between a plurality of positions, a target configured to move with the movement of the member, the target changing a field strength based on the movement; and a device configured to generate a signal when the field strength changes based on the movement by a predetermined threshold amount, wherein the signal is transmitted from the device to the electronic control unit to change the electronic control unit from the powered off state to the powered on state.

15. The assembly of claim 14, wherein the device is a Hall effect sensor.

16. The assembly of claim 14, further comprises:
a sensor assembly having an angular sensor configured to sense a movement of the member.

17. The assembly of claim 16, wherein the electronic control unit is communicatively coupled to the angular sensor and configured to determine the movement of the target.

18. The assembly of claim 17, wherein the angular sensor is configured to sense a target generated in-plane magnetic field components to sense the movement of the member.

19. The assembly of claim 18, wherein the electronic control unit is configured to determine the movement of the target by the target generated in-plane magnetic field components sensed by the angular sensor.

20. The assembly of claim 14, wherein the target is formed with a magnetic material.

* * * * *